M. D. Whipple,
Felting Machine.

No. 95,863.   Patented Oct. 12, 1869.

Witnesses
F. Smith
Alex Mahon

Inventor
M. D. Whipple
by his attorney
A. M. Smith

M. D. Whipple,
Felting Machine.

No. 95863.　　　　　　　Patented Oct. 12, 1869.

M. I. Whipple
Felting Machine.
No. 95,863. Patented Oct. 12. 1869
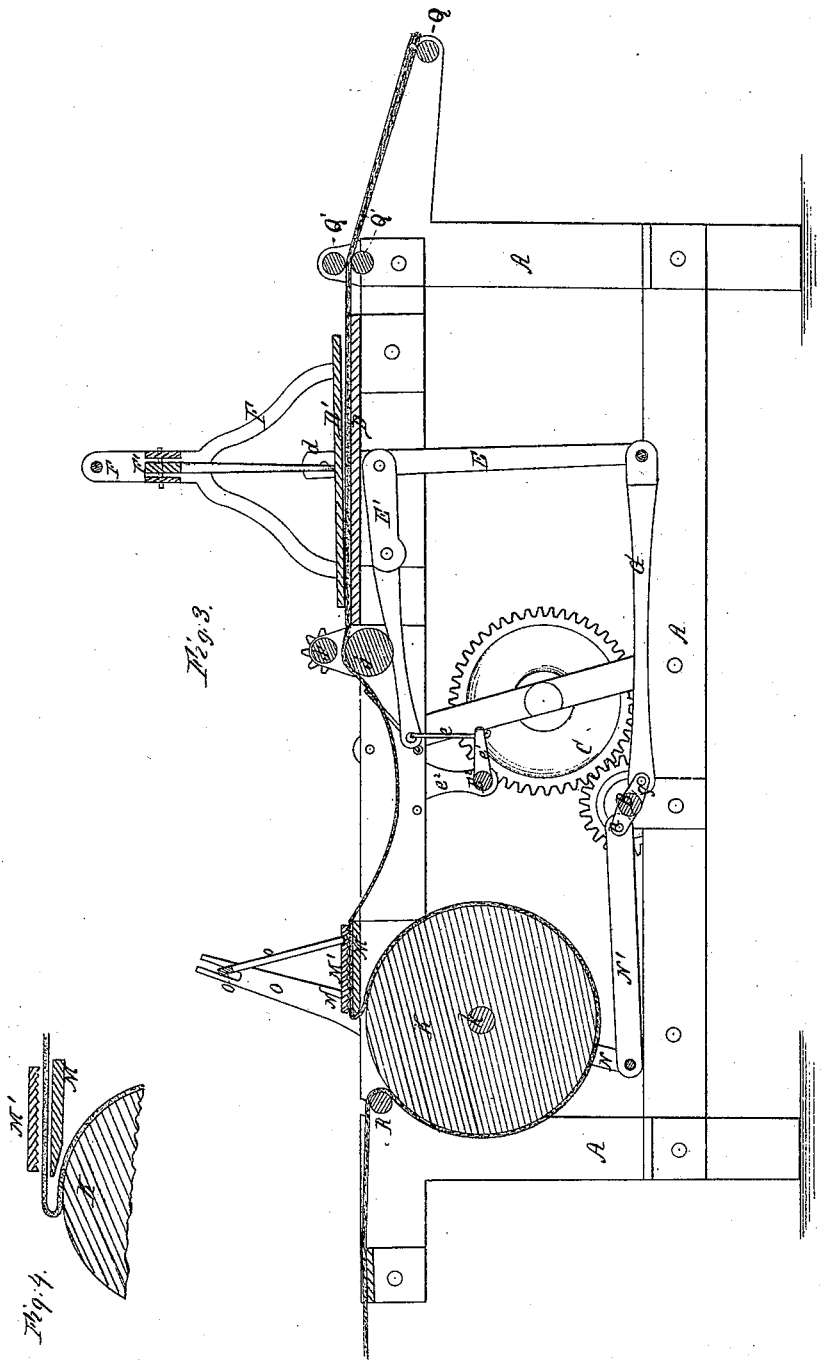

UNITED STATES PATENT OFFICE.

MILTON D. WHIPPLE, OF CAMBRIDGE, MASSACHUSETTS, ASSIGNOR TO JAMES T. SANFORD, OF NEW YORK, N. Y.

IMPROVED MACHINE FOR THE MANUFACTURE OF FELT.

Specification forming part of Letters Patent No. 95,863, dated October 12, 1869.

*To all whom it may concern:*

Be it known that I, MILTON D. WHIPPLE, of Cambridge, county of Middlesex and State of Massachusetts, have invented certain new and useful Improvements in Machinery for the Manufacture of Felt and other Cloths, of which the following is a full, clear, and exact description, reference being had to the accompanying drawings, making a part of this specification, in which—

Figure 1:
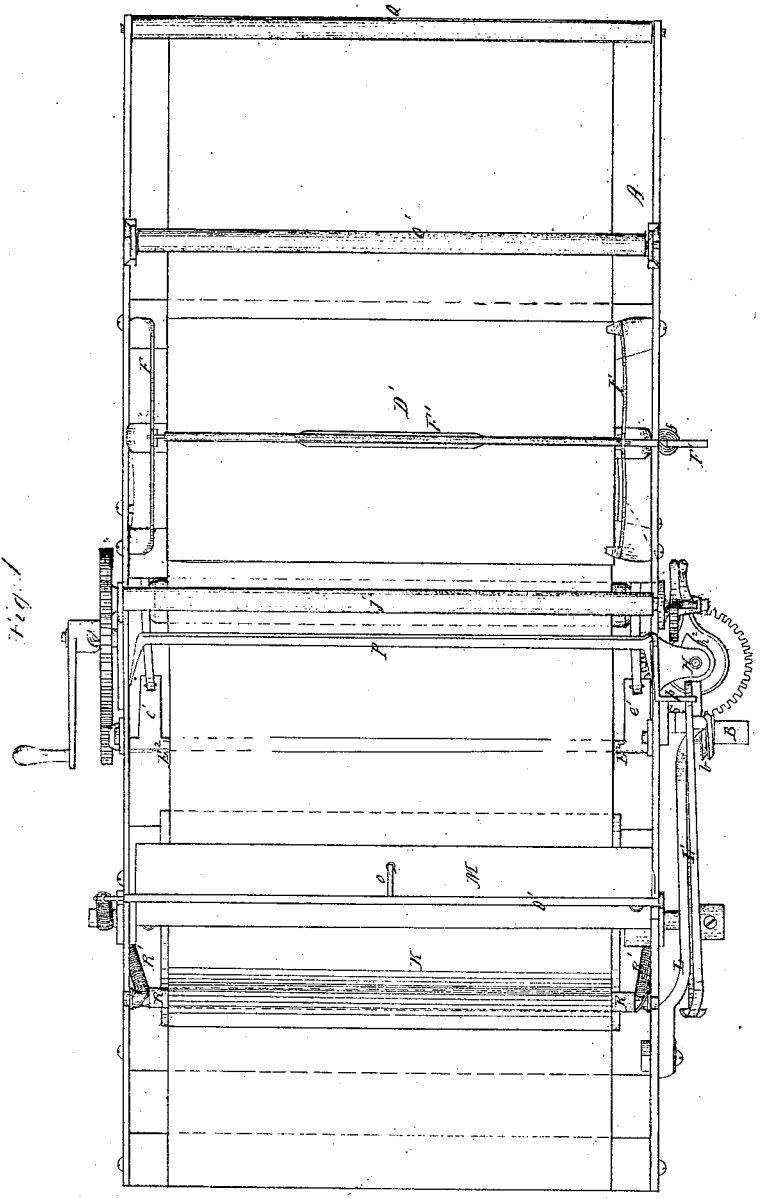
Figure 2:
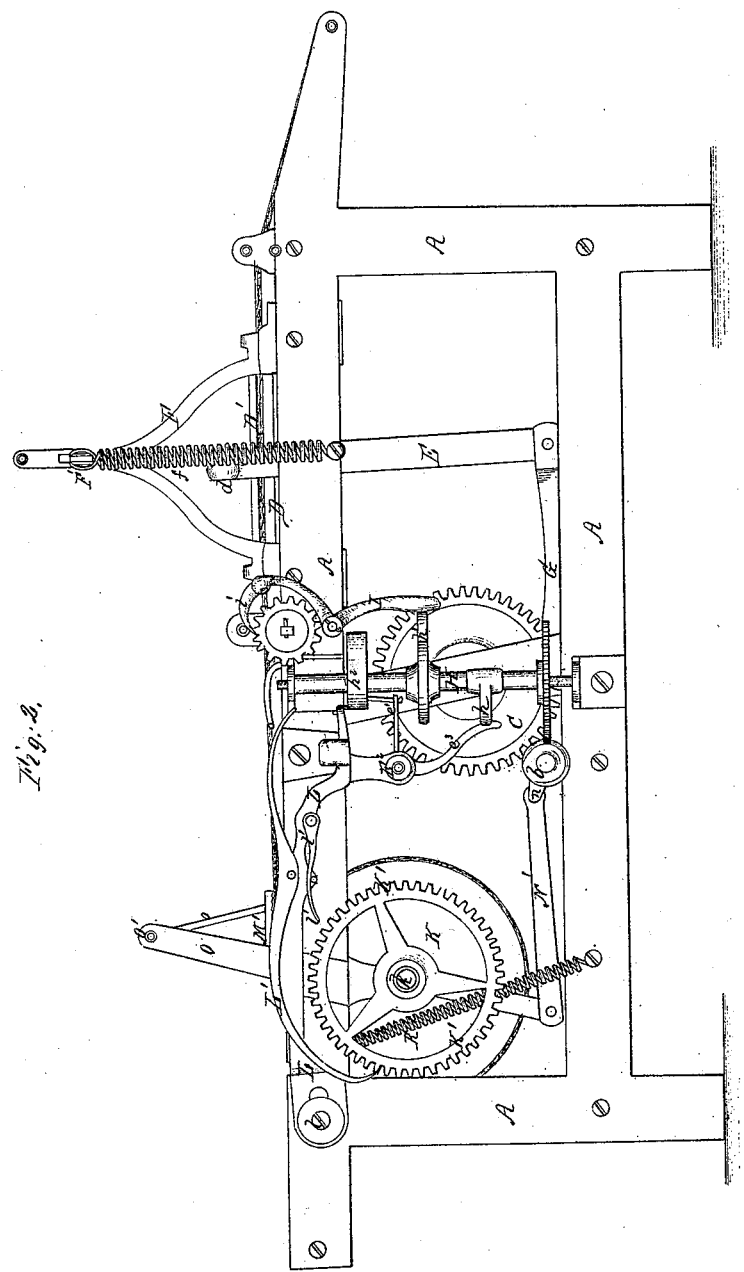

Figure 1 is a plan or top view of a machine embracing my improvements. Fig. 2 is a side elevation, and Fig. 3 is a longitudinal vertical section, of the same.

Similar letters of reference denote corresponding parts wherever used.

My invention will be best understood from the following description of the same, with reference to the drawings, in which—

A represents a frame-work of any suitable size and material, in the lower horizontal part of which is mounted a main shaft, B, provided at one end with a pinion, which receives motion from a drive-wheel, C, operated in any desired manner. On the upper portion of the frame A is mounted a perforated bed, D, over which the bat passes, said bed D being of a construction corresponding to those now in use, and adapted to let steam on the bat from underneath.

D' is a rubbing-plate provided at its ends with central upright lugs or ears, $d$, which are pivoted to the upper ends of vibrating arms or levers E, through which a vibratory rubbing movement is imparted to the rubbing-plate D'. The levers E are mounted or pivoted in horizontal levers E', which are pivoted in the sides of the frame A. The ends of levers E' (opposite those carrying levers E) are connected by links $e$ with arms $e'$ of a rock-shaft, $E^2$, mounted in pendants $e^2$, and by the movement of which rock-shaft $E^2$ the levers E and rubbing-plate D' are raised and lowered as desired, and for a purpose which will be explained hereinafter.

On the sides of the frame A, and at the ends of the rubber-bed, are uprights F, connected at their upper ends by a slotted bar, F', said bar F' being pivoted at one end, and working in a slot in the upright at the other end, said end being further held down in place by means of a coil-spring, $f$, connected with the frame A. The bar F' is provided with pendent rods or fingers, the lower ends of which rest in sockets in the rubbing-plate D', and serve through the action of the coil-spring $f$ to hold the rubbing-plate D' firmly and evenly down on the bed D when not raised therefrom by the action of the rock-shaft $E^2$ and levers E', referred to. The lower ends of the levers E are connected by arms G with cranks or eccentrics $g$ on the driving-shaft B, by the rotation of which a vibratory rubbing motion is imparted to the rubbing-plate D'. The end of shaft B (opposite that armed with the pinion) is provided with a worm or screw, $b$, which engages with and drives a worm-wheel keyed to the lower end of an upright shaft, H. Shaft H is armed with cams $h$ $h'$, the former of which operates an arm, $e^3$, attached to the rock-shaft $E^2$, and serves thereby to raise the rubbing-plate D', through the medium of levers E E', above described, once in each revoluion of shaft H. The cam $h'$ operates upon a pivoted lever, I, which actuates a pawl, $i$, at the upper end of said lever, the pawl $i$ engaging, through the medium of a ratchet-wheel, $i'$, with and rotating a pair of feed-rollers, $j$ $j'$, between which the cloth passes after leaving the bed D and rubbing-plate D'. Said rollers are actuated simultaneously with the raising of the rubbing-plate D', and serve to draw the cloth forward intermittently.

Other parts of the machine represented in the drawings are described in another application of even date herewith, and need not, therefore, be further described here.

The purpose and object of the part of my improvement embraced in this application is to provide for releasing the bat or cloth at intervals by raising the rubbing-plate D' therefrom, thereby leaving the bat or cloth free to feed forward without undue tension; and, further, to combine with such intermittently-lifting rubbing-plate D' an intermittent feed mechanism automatically operated simultaneously with the lifting of the plate. The means devised for effecting these objects will be understood from the foregoing description.

Having now described my invention, what

I claim under this application, and desire to secure by Letters Patent, is—

1. Automatically lifting the rubbing-plate D', to permit the feed of the cloth or bat to the bed D by means substantially as described.

2. The intermittently-operating feed-rolls $j\ j'$, in combination with the intermittently-lifting rubbing-plate D', substantially as described.

3. The combination of devices for simultaneously operating the intermittently-lifting rubbing-plate D' and intermittently-rotating feed-rolls $j\ j'$, as described.

4. The combination of the levers E E', rock-shaft $E^2$, and cam $h$, for lifting the vibrating rubbing-plate D' without interfering with its vibratory movement.

MILTON D. WHIPPLE.

Witnesses:
H. H. DOUBLEDAY,
ALEX. MAHON.